(12) United States Patent
Fuss et al.

(10) Patent No.: US 10,902,656 B2
(45) Date of Patent: Jan. 26, 2021

(54) SYSTEM AND METHOD FOR GENERATING A DIGITAL IMAGE COLLAGE

(71) Applicant: FUJIFILM North America Corporation, Valhalla, NY (US)

(72) Inventors: William A. Fuss, Rochester, NY (US); Nathaniel P. Curry, Rochester, NY (US); Christopher T Asbury, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 448 days.

(21) Appl. No.: 15/444,825

(22) Filed: Feb. 28, 2017

(65) Prior Publication Data

US 2017/0249767 A1    Aug. 31, 2017

Related U.S. Application Data

(60) Provisional application No. 62/301,483, filed on Feb. 29, 2016.

(51) Int. Cl.
| | |
|---|---|
| *G06T 11/60* | (2006.01) |
| *H04N 1/00* | (2006.01) |
| *G06F 40/106* | (2020.01) |
| *G06T 3/40* | (2006.01) |

(52) U.S. Cl.
CPC ............ *G06T 11/60* (2013.01); *G06F 40/106* (2020.01); *H04N 1/00145* (2013.01); *H04N 1/00167* (2013.01); *H04N 1/00188* (2013.01); *H04N 1/00196* (2013.01); *G06T 3/4038* (2013.01); *G06T 2200/32* (2013.01)

(58) Field of Classification Search
CPC ....... G06T 11/60; G06T 11/00; G06T 3/4038; H04N 1/00196; G06F 17/212; G06F 17/211; G06F 17/248
See application file for complete search history.

(56) References Cited

U.S. PATENT DOCUMENTS

| | | |
|---|---|---|
| 6,940,526 B2 | 9/2005 | Noda et al. |
| 7,010,176 B2 | 3/2006 | Kusunoki |
| 7,133,050 B2 | 11/2006 | Schowtka |
| 7,209,149 B2 | 4/2007 | Jogo |
| 7,489,324 B2 | 2/2009 | Royal et al. |
| 7,529,390 B2 | 5/2009 | Zhang et al. |
| 7,573,486 B2 | 8/2009 | Mondry et al. |

(Continued)

*Primary Examiner* — Scott T Baderman
*Assistant Examiner* — Benjamin Smith
(74) *Attorney, Agent, or Firm* — Woods Oviatt Gilman LLP; Dennis B. Danella, Esq.

(57) ABSTRACT

A system and method for generating a digital image collage is provided. The method comprises displaying a user interface comprising a collage template including a layout, and a catalog segment; displaying a plurality of digital images in the catalog segment; generating a first aperture in the layout to establish a first arrangement, and populating the first aperture with the first selected digital image; changing the layout from the first arrangement to a second arrangement, wherein the second arrangement comprises randomly dividing the first aperture into a second aperture and a third aperture, populating the second aperture with the first selected digital image, and populating the third aperture with the second selected digital image thereby generating the digital image collage.

19 Claims, 11 Drawing Sheets

(56) References Cited

U.S. PATENT DOCUMENTS

| | | |
|---|---|---|
| 7,595,809 B2 | 9/2009 | Widdowson |
| 7,656,543 B2 | 2/2010 | Atkins |
| 7,675,528 B2 | 3/2010 | Walker, Jr. et al. |
| 7,689,064 B2 * | 3/2010 | Miksovsky ............. G06T 11/60 382/294 |
| 7,689,909 B1 | 3/2010 | Szuszczewicz |
| 7,743,322 B2 * | 6/2010 | Atkins ................... G06T 11/60 715/243 |
| 7,760,956 B2 * | 7/2010 | Lin ..................... G06K 9/00711 382/254 |
| 7,848,596 B2 | 12/2010 | Widdowson |
| 7,961,200 B2 | 6/2011 | Walker, Jr. et al. |
| 8,065,627 B2 | 11/2011 | Atkins |
| 8,103,130 B2 | 1/2012 | Royal et al. |
| 8,176,414 B1 * | 5/2012 | Baluja .................. G06F 17/212 715/238 |
| 8,180,178 B2 | 5/2012 | Cheatle |
| 8,265,429 B2 | 9/2012 | Sagawa |
| 8,385,690 B2 | 2/2013 | Royal et al. |
| 8,422,794 B2 | 4/2013 | Ptucha et al. |
| 8,504,932 B2 | 8/2013 | Quek et al. |
| 8,577,173 B2 | 11/2013 | Cok et al. |
| 8,806,332 B2 | 8/2014 | Cok |
| 8,903,200 B2 | 12/2014 | Yamaji et al. |
| 8,907,984 B2 | 12/2014 | Weber et al. |
| 8,908,984 B2 * | 12/2014 | Carmel ................. H04N 19/60 382/239 |
| 8,923,551 B1 | 12/2014 | Grosz et al. |
| 8,923,617 B2 | 12/2014 | Yamaji et al. |
| 8,930,811 B2 | 1/2015 | Cok et al. |
| 8,947,451 B2 | 2/2015 | Mondry et al. |
| 8,976,198 B2 | 3/2015 | Borders et al. |
| 9,025,907 B2 | 5/2015 | Bogart et al. |
| 9,049,419 B2 | 6/2015 | Cheatle |
| 9,152,292 B2 | 10/2015 | Xiao et al. |
| 9,153,056 B2 | 10/2015 | Hilt |
| 9,251,763 B2 | 2/2016 | Shetterly et al. |
| 9,491,318 B2 * | 11/2016 | Swire ................. H04N 1/00196 |
| 9,507,506 B2 * | 11/2016 | Grosz ................ H04N 1/00164 |
| 9,558,577 B2 * | 1/2017 | Hobbs .................... G06T 11/60 |
| 9,665,963 B1 * | 5/2017 | Chang ..................... G06T 11/60 |
| 2003/0160824 A1 | 8/2003 | Szumla |
| 2005/0071781 A1 * | 3/2005 | Atkins ................. G06F 17/509 715/838 |
| 2005/0071783 A1 * | 3/2005 | Atkins ................. G06F 17/509 715/851 |
| 2006/0181736 A1 * | 8/2006 | Quek ..................... G06T 11/60 358/1.18 |
| 2006/0257048 A1 * | 11/2006 | Lin ..................... G06K 9/00711 382/276 |
| 2007/0074110 A1 * | 3/2007 | Miksovsky ............. G06T 11/60 715/210 |
| 2008/0222560 A1 * | 9/2008 | Harrison ............. G06F 3/04847 715/800 |
| 2010/0189355 A1 * | 7/2010 | Tanaka .................... G06T 11/60 382/190 |
| 2010/0199227 A1 * | 8/2010 | Xiao ..................... G06F 3/0481 715/863 |
| 2011/0280476 A1 | 11/2011 | Berger et al. |
| 2011/0280497 A1 * | 11/2011 | Berger .................... G06T 11/60 382/306 |
| 2011/0283210 A1 * | 11/2011 | Berger ................. G06F 3/0481 715/765 |
| 2012/0013640 A1 | 1/2012 | Chen |
| 2012/0042240 A1 * | 2/2012 | Oliveira ................ G06F 17/212 715/243 |
| 2012/0082401 A1 * | 4/2012 | Berger ................ G06F 16/5866 382/306 |
| 2012/0117473 A1 * | 5/2012 | Han ...................... G11B 27/034 715/723 |
| 2012/0201476 A1 * | 8/2012 | Carmel ................ H04N 19/176 382/239 |
| 2013/0185632 A1 * | 7/2013 | Damera-Venkata ........................ G06F 40/186 715/243 |
| 2013/0314434 A1 * | 11/2013 | Shetterly .................. G09G 5/14 345/593 |
| 2014/0189476 A1 | 7/2014 | Berthelot et al. |
| 2014/0280054 A1 | 9/2014 | Karunakaran et al. |
| 2015/0193407 A1 * | 7/2015 | Baluja .................. G06F 17/212 715/202 |
| 2015/0206281 A1 * | 7/2015 | Takada .................. G06F 3/1415 345/666 |
| 2015/0221117 A1 * | 8/2015 | Hobbs .................... G06T 11/60 382/284 |
| 2015/0278986 A1 | 10/2015 | Edwin et al. |
| 2016/0027195 A1 | 1/2016 | Sheasby et al. |
| 2016/0139761 A1 * | 5/2016 | Grosz .................. G06F 3/1243 715/769 |
| 2016/0301813 A1 * | 10/2016 | Swire ................. H04N 1/00188 |
| 2017/0024362 A1 * | 1/2017 | Borders ................ G06F 17/212 |
| 2017/0041542 A1 * | 2/2017 | Ono ....................... G06T 5/007 |

* cited by examiner

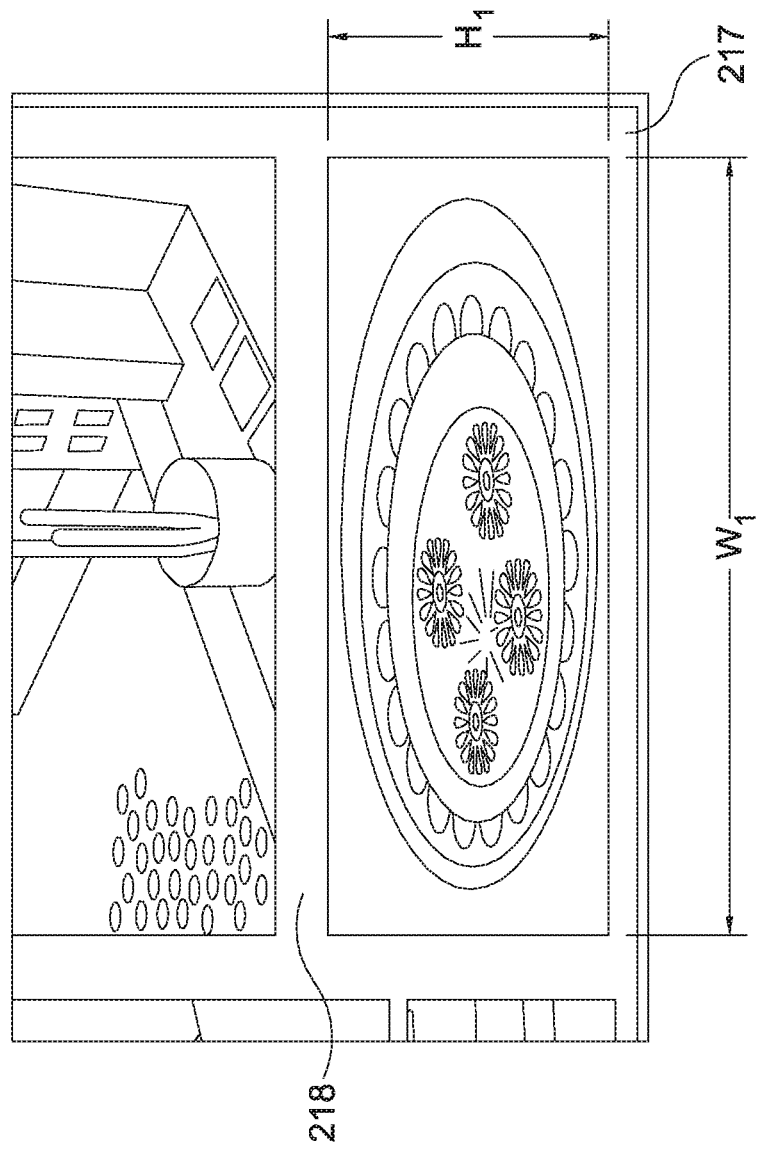

SYSTEM AND METHOD FOR GENERATING A DIGITAL IMAGE COLLAGE

CROSS-REFERENCE TO REPLATED APPLICATIONS

This application claims the benefit of U.S. Patent Application No. 62/301,483, filed on Feb. 29, 2016, which is hereby incorporated by reference in its entirety.

FIELD OF THE INVENTION

The present invention is directed to a system and method for generating a digital image collage; in particular, the present invention is a method directed to generating the digital image comprising a collage template with randomized layouts with varying aperture sizes and/or shapes, and digital images positioned within the respective apertures; further, the system and method may include minimum aspect ratio limitations for each aperture, auto-cropping the digital images to fit within respective apertures, and allowing for the selection of a target digital image that is populated and displayed in the apertures with the largest area.

BACKGROUND OF THE INVENTION

Handheld mobile computing devices such as smartphones, digital cameras and webcams have enabled users to capture digital images that are used to create photo collages made up of multiple digital images laid out on a single page. In particular, existing software has made it possible to create collages made up of digital images of differing sizes. However, these existing solutions provide templates with preset layouts. While these templates may be convenient for the user, the generated collages look generic, uncreative, and bland, leaving the user disinterested with repeating the process of generating such a collage. Accordingly, what is needed is a system and method for providing randomized digital image collage layouts that provide a unique look and feel for each new collage. The present invention fills this need as well as other needs.

SUMMARY OF THE INVENTION

One aspect of the present invention is directed to a method programmed for execution in a computing environment for generating a digital image collage. The method comprising: a) displaying a user interface comprising a collage template including a layout, a catalog segment, and an interface control configured to provide one or more user input commands; b) displaying a plurality of digital images in the catalog segment; c) receiving a first user input command on a first selected digital image from the plurality of digital images in the catalog segment, and in response to the first user input command: generating a first aperture in the layout to establish a first arrangement, and populating the first aperture with the first selected digital image; and d) receiving a second user input command on a second selected digital image from the plurality of digital images in the catalog segment, and in response to the second user input command: changing the layout from the first arrangement to a second arrangement, wherein the second arrangement comprises randomly dividing the first aperture into a second aperture and a third aperture, populating the second aperture with the first selected digital image, and populating the third aperture with the second selected digital image thereby generating the digital image collage.

The method may further comprise the step of: e) receiving a third user input command on a third selected digital image from the plurality of digital images in the catalog segment, and in response to the third user input command: changing the layout from the second arrangement to a third arrangement, wherein the third arrangement comprises randomly dividing the second aperture into a fourth aperture and a fifth aperture, populating the third aperture with one of the first selected digital image, the second selected digital image, or the third digital image, populating the fourth aperture with one of the two remaining selected digital images, and populating the fifth aperture with the remaining selected digital image.

In addition, each of the second aperture and the third aperture may be assigned a weight, wherein assigning the weight takes into account, for example, an area of the respective aperture, normalized ratio, ratio coefficient, error percentage, and error percentage coefficient. The method may further comprise the steps of: comparing the weight of the second aperture and the third aperture; determining that the second aperture has a greater weight; and randomly dividing the second aperture into the fourth and the fifth aperture. The method may further comprise the step of cropping at least one of the first selected digital image, the second selected digital image, and the third selected digital image prior to being populated into the respective aperture. The step of cropping may include automatically cropping the at least one of the first selected digital image, the second selected digital image, and the third selected digital image. The method may further include the steps of: receiving a fourth user input command identifying one of the first selected digital image, the second selected digital image, and the third selected digital image as a target digital image; and changing the size of the respective aperture so that the respective aperture includes an area that is greater than the other apertures.

Further, the step of randomly dividing the first aperture results in the second aperture and the third aperture each having at least one of a minimum aspect ratio and a maximum aspect ratio. The minimum aspect ratio and the maximum aspect ratio is provided for a portrait orientation or a landscape orientation. Also, the random dividing of the first aperture may result in the second aperture and the third aperture each having a minimum area. Further, the layout may include a border surrounding the second aperture and the third aperture.

The method may also further comprising the step of: e) receiving a third user input command on a third selected digital image from the plurality of digital images in the catalog segment, and in response to the third user input command: changing the layout from the second arrangement to a third arrangement, wherein the third arrangement comprises randomly dividing the third aperture into a fourth aperture and a fifth aperture, populating the second aperture with one of the first selected digital image, the second selected digital image, or the third digital image, populating the fourth aperture with one of the two remaining selected digital images, and populating the fifth aperture with the remaining selected digital image In another aspect, the method may be embodied in a non-transitory computer-readable medium having thereon computer-executable instructions for performing the above-referenced steps.

In yet another aspect, the method may be implemented in a system for generating a digital image collage using a remote computing device. The system may comprise a server including a memory, wherein the server is in communication with the remote computing device through a network, and wherein the memory having a collage module stored therein. The system may further include a photofinisher device in communication with at least one of the server or the remote computing device through the network. The collage module is configured to: a) provide a user interface on a display of the remote computing device comprising a collage template including a layout, a catalog segment, and an interface control configured to provide one or more user input commands; b) provide for the display of a plurality of digital images in the catalog segment on the display of the remote computing device; c) receive a first user input command on a first selected digital image from the plurality of digital images in the catalog segment, and in response to the first user input command: generate a first aperture in the layout to establish a first arrangement, and populate the first aperture with the first selected digital image; d) receive a second user input command on a second selected digital image from the plurality of digital images in the catalog segment, and in response to the second user input command: change the layout from the first arrangement to a second arrangement, wherein the second arrangement comprises randomly dividing the first aperture into a second aperture and a third aperture, populate the second aperture with the first selected digital image, populate the third aperture with the second selected digital image, and generate a collage template file representative of the collage template in the second arrangement including the first selected digital image and the second selected digital image thereby generating the digital image collage.

The collage module in the system may be configured for communicating the collage template file to the photofinisher device for printing the digital image collage in the second arrangement including the first selected digital image and the second selected digital image. The first and second digital images may be stored in the memory of the server, and the remote computing device may be a mobile computing device or a photo kiosk.

Additional benefits of the above-described system and method for organizing digital images in a collage template are set forth in the following discussion.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein:

FIG. 7A is an enlarged view of the area labeled as 7A in FIG. 7 showing certain digital image characteristics and borders;

DETAILED DESCRIPTION OF THE INVENTION

Figure 1:
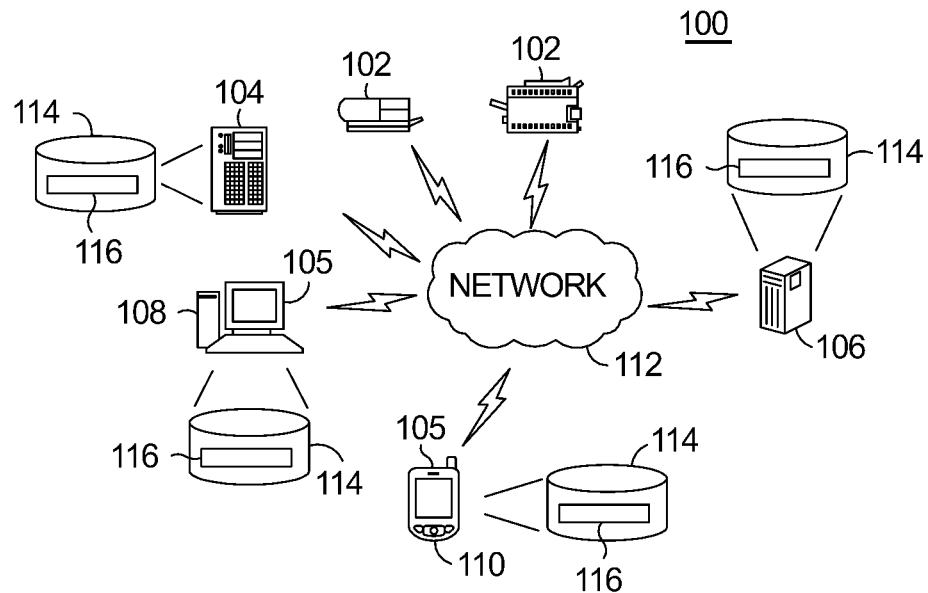
FIG. 1 is a schematic diagram showing an exemplary system that may be used with a method of generating a digital image collage template in accordance with one aspect of the present invention.

Referring to the drawings in detail, with particular reference to FIG. 1, one aspect of the present invention includes a system 100 that may be used to generate a digital image collage comprising a collage template including a plurality of randomly positioned apertures, and a plurality of selected digital images populated in the respective apertures. Further, system 100 may allow for the ordering of a print product comprising the generated digital image collage including selected digital images. Other aspects of the present invention will be discussed in more detail below.

System 100 may generally include one or more photofinishing devices 102, a server 104, and a remote computing device 105, such as, for example, a photo kiosk 106, a desktop computing device 108 or a mobile computing device 110. It should be understood that photo kiosk 106 may also have the capability to serve as photofinishing device 102. Each of the aforementioned components of system 100 may be in communication with each through a network 112, such as a wide area network or local area network through a wired or wireless connection. One or more of server 104, photo kiosk 106, desktop computing device 108, and mobile computing device 110 may include a memory 114, which may have a collage module 116 stored therein. As such, collage module 116 is not limited to any specific hardware or software configuration, but may rather be implemented as computer executable instructions in any computing or processing environment, including in digital electronic circuitry or in computer hardware, firmware, device driver, or software. As will be discussed in more detail below, collage module 116 may be used to generate a digital image collage comprising a collage template including one or more randomly configured apertures for a corresponding number of selected digital images, and allow for the population or placement of the selected digital images into the respective apertures. Collage module 116 may also be used to generate and communicate a collage order including the digital image collage to the any one of photofinishing devices 102 or kiosk 106 to create a print product selected by a user.

Each of photofinishing devices 102 is a printing device configured for producing a print product that incorporates the digital image collage. A print product can be any type of good or electronic product that has the digital image collage printed or displayed thereon, such as, for example, photographic print, photo book, calendar, mug, poster, T-shirt, gift card, canvas print, mouse pad, and the like. Given the wide variety of print products that may be produced, system 100 may include a plurality of different types of photofinishing devices capable of producing such print products. Photofinishing devices 102 may be physically located in a single physical location, such as a fulfillment center (e.g., retail/drug store) or in different physical locations, and may be in communication with each other through network 112.

Mobile computing device 110 may be any type of smartphone, tablet, or other mobile device including a processor capable of displaying digital images, generating the digital image collage using collage module 116, and communicating with any one of photofinishing devices 102 or photo kiosk 106 to create the print product. Likewise, it should be understood that desktop computing device 108 may include a processor that is capable of displaying digital images, generating the digital image collage using collage module 116, and communicating with any one of photofinishing devices 102 or photo kiosk 106 using collage module 116 to create the print product.

In accordance with one aspect, photofinishing device 102 is configured for receiving the collage order from remote computing device 105, server 104, or kiosk 106 through network 112. It should be understood that any of photofinishing devices 102 may directly receive the collage order from remote computing device 105 through network 112, or receive the collage order from server 104 or kiosk 106 after the collage order is communicated to server 104 or kiosk 106 from remote computing device 105, or generated by server 104 or kiosk 106. Moreover, in preparing the collage template using collage module 116, remote computing device 105 may be used to upload one or more digital images by accessing the digital images stored in memory 114 of that particular device, through the implementation of a corresponding camera device (e.g., webcam or digital camera), or by accessing those digital images stored in memory 114 of server 104 through network 112. For example, remote computing device 105 may include one or more software applications including executable instructions that operate to allow a user to capture, save, and/or edit digital images in the device's memory 114 or by a third party that provides for the storage of digital images, such as server 104, such as INSTAGRAM® and IPHOTO®.

Figure 2:
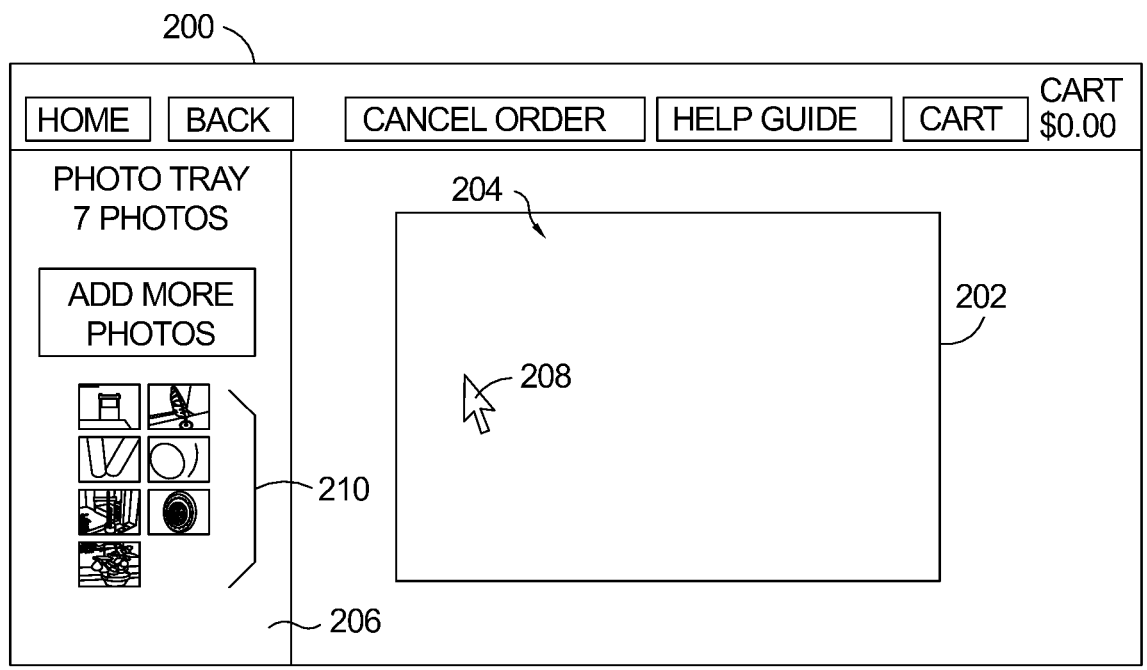
FIG. 2 is an exemplary screen shot of a user interface provided in accordance with the method of the present invention.

As best seen in FIG. 2, shows an exemplary screen shot of a user interface 200 provided by an embodiment of collage module 116. In operation, collage module 116 generates a digital image collage 201 (FIGS. 5-10) including a collage template 202 including a plurality of digital images 210 as a result of instructions received through user interface 200. Collage template 202 (having, for example, a predetermined or user selected height and width) is displayed on user interface 200 and includes a layout 204, a catalog segment 206, and an interface control 208 configured to allow a user to provide input commands into collage module 116. A plurality of digital images 210, either in thumbnail or full format, are displayed in catalog segment 206. In the present example, digital images 210 may be reduced-resolution versions of the digital images stored in memory 114. It should be understood that digital images 210 may either be selected by the user for population into collage template 202, automatically selected by collage module 116 for population into collage template 202, or some combination thereof. One or more of digital images 210 may also be automatically or manually processed when in catalog segment 206 to enhance the images (sharpness, hue, brightness, etc.), convert the images to sepia or black and white, remove red eye, or be manipulated in another manner.

Figure 3:
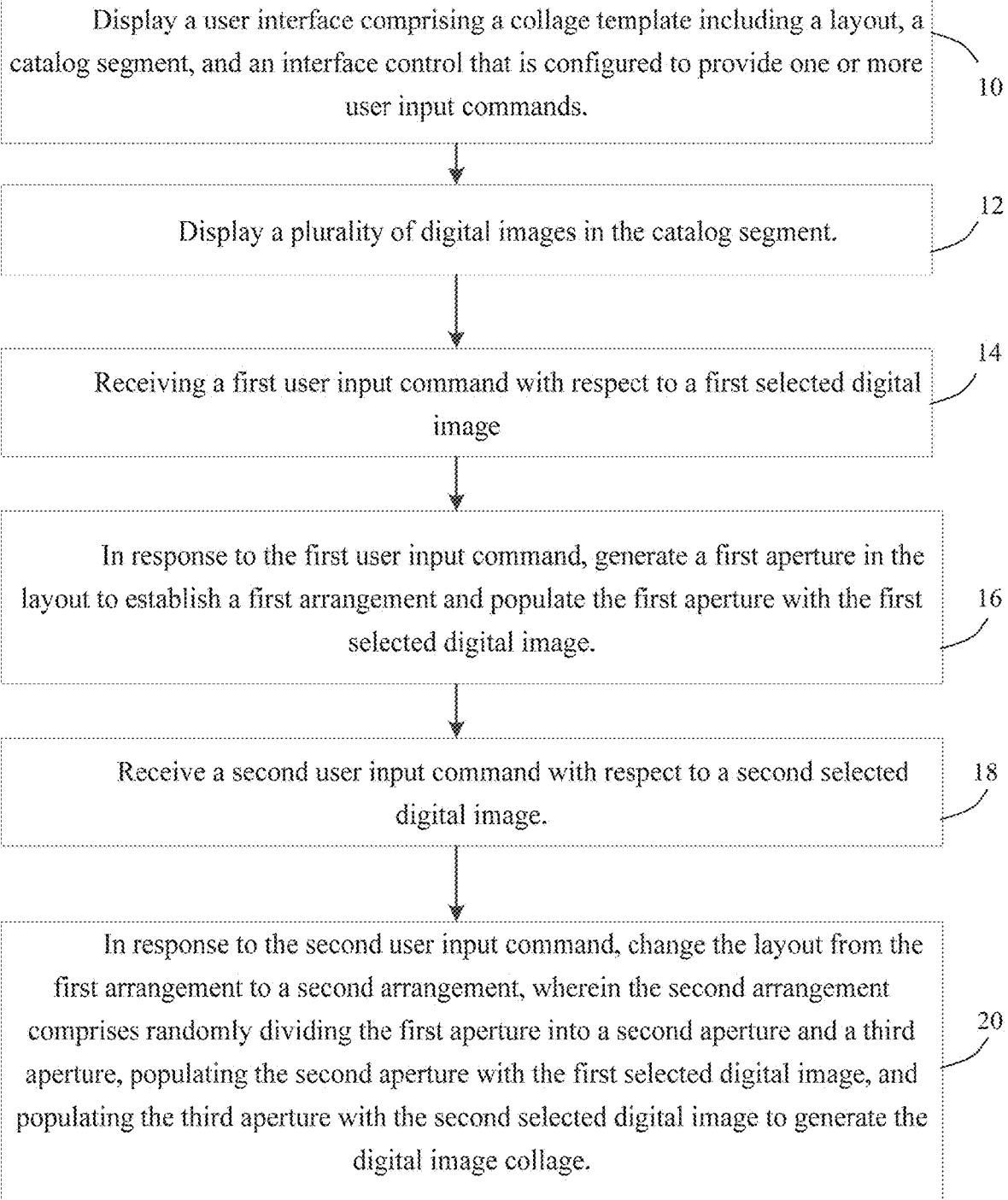
FIG. 3 is a flow diagram of an embodiment of an algorithmic method for generating the digital image collage.
Figure 4:
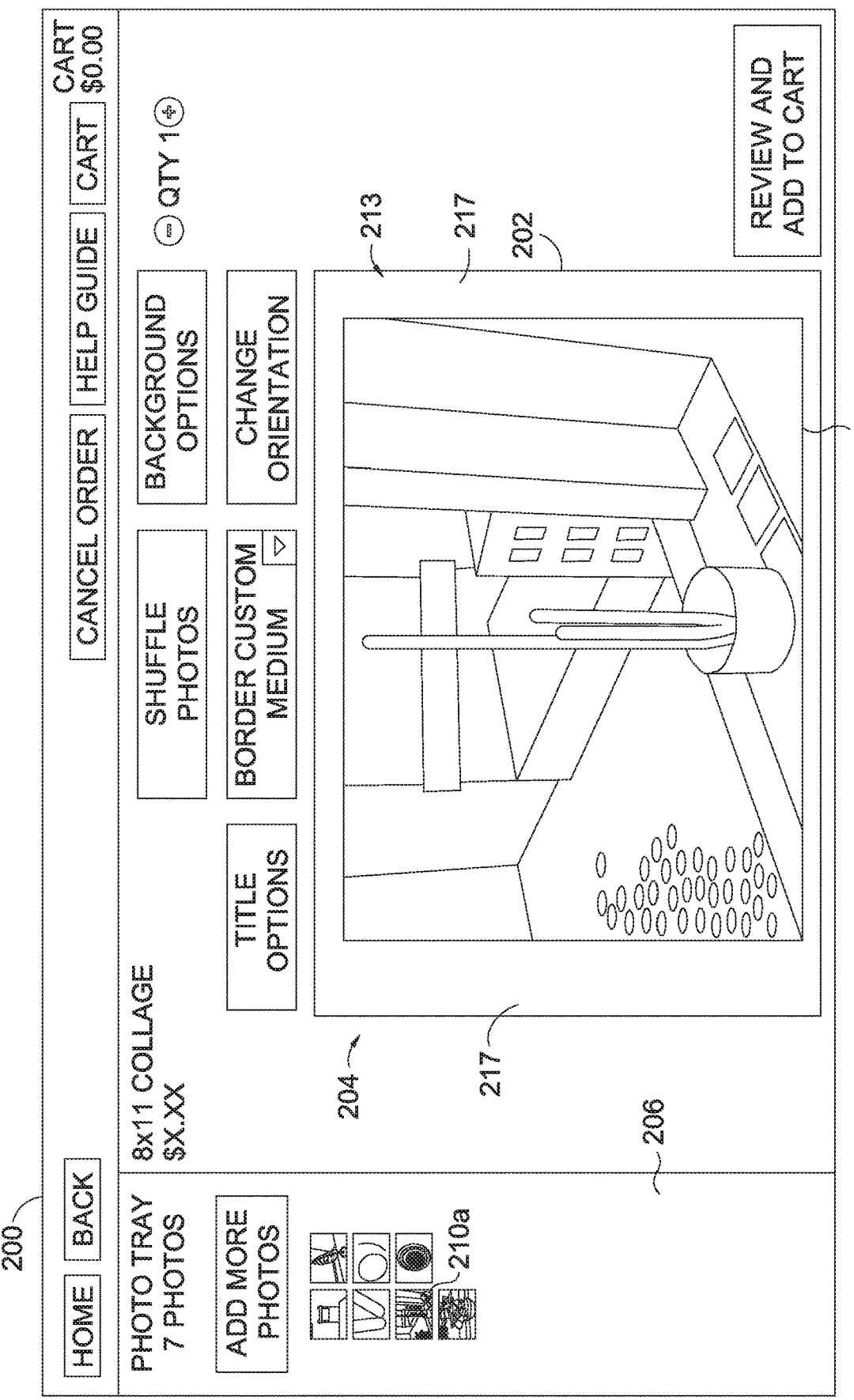
FIG. 4 is an exemplary screen shot of the user interface in FIG. 2 showing another step of the algorithmic method for generating the collage template including a first digital image.

FIG. 3 shows a flow diagram of an exemplary machine-executable method implemented by collage module 116. With reference to the method of FIG. 3, as well as the screen shots shown in FIGS. 4 and 5, collage module 116 operates to display user interface 200 on remote computing device 105 at block 10. As indicated above, user interface 200 includes the collage template 202 with layout 204, catalog segment 206, and interface control 208. Digital images 210 retrieved from memory 114 or captured by remote computing device 105 are also displayed in catalog segment 206 at block 12. As best shown with particular reference to FIGS. 3 and 4, the algorithmic method further comprises the step of receiving a first user input command on a first selected digital image 210a that is selected from catalog segment 206 at block 14. In response to the first user input command, collage module 116 automatically generates a first aperture 212 within layout 204 to establish a first arrangement 213 at block 16. An aperture, such as first aperture 212, is a designated region provided in template layout 204 that includes an area is configured for population or placement of a digital image that is selected from catalog segment 206. As such, in further response to the first user input command, collage module 116 subsequently populates first aperture 212 with first selected digital image 210a. Digital image 210a may be automatically or manually processed when in aperture 212 to enhance image 201a (sharpness, hue, brightness, etc.), convert image 201a to sepia or black and white, remove red eye, or be manipulated in another manner. Optionally, a border 217 may be provided around aperture 217.

Figure 5:
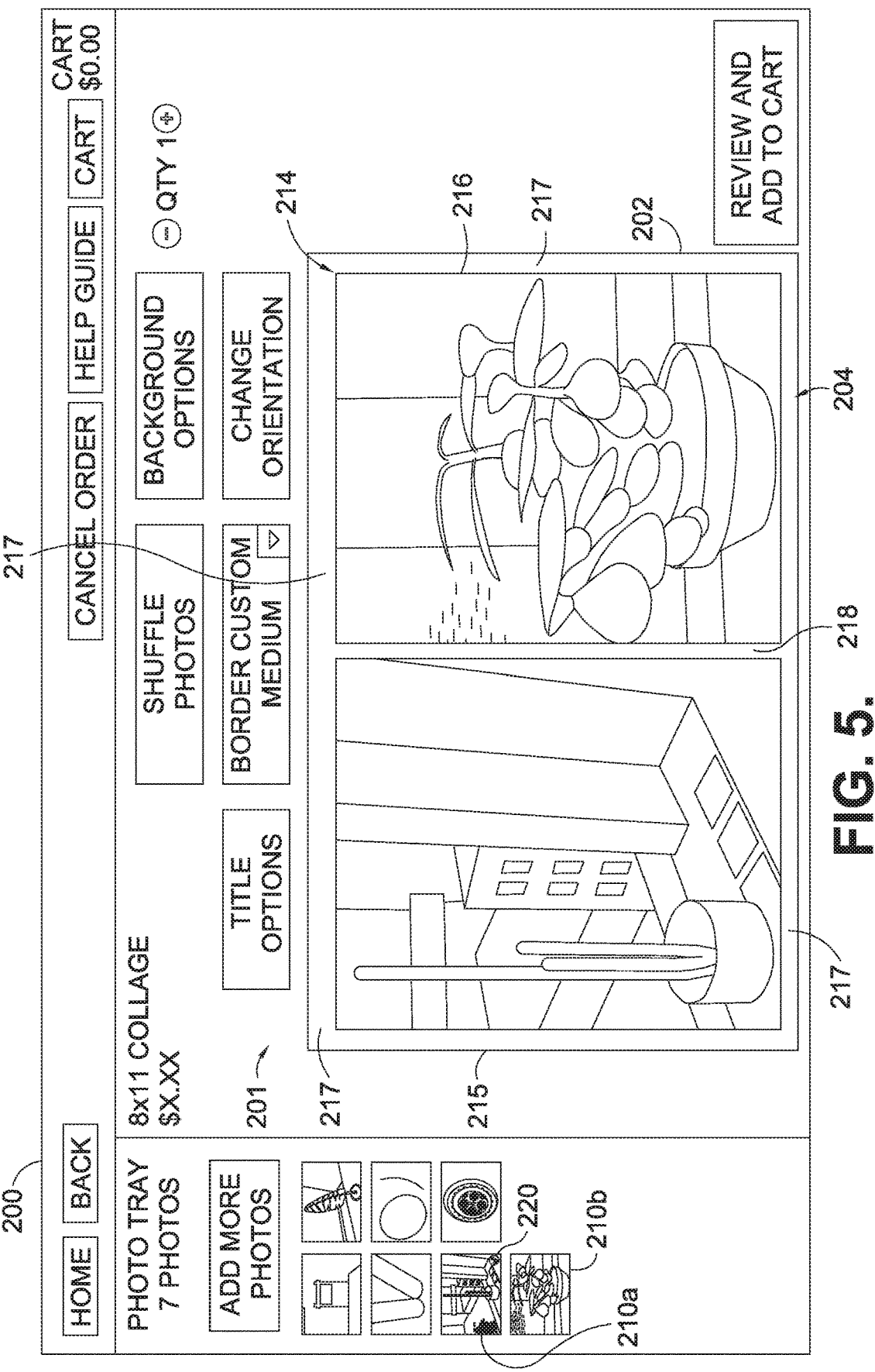
FIG. 5 is an exemplary screen shot of the user interface in FIG. 2 showing another step of the algorithmic method for generating the digital image collage including the first digital image and a second digital image.

As seen in FIGS. 3 and 5, the algorithmic method implemented by collage module 116 further comprises the step of receiving a second user input command on a second selected digital image 210b at block 18. In response to the second user input command, collage module 116 automatically changes layout 204 from first arrangement 213 to a second arrangement 214. To arrive at second arrangement 214, collage module 116 randomly divides first aperture 212 into two parts, namely, a second aperture 215 and a third aperture 216 at block 20. This random division may include dividing first aperture 212 in two equal or unequal parts along either the vertical, horizontal, or diagonal (non-perpendicular) axis. In another aspect, first aperture 212 may be divided using a curved line. Optionally, border 217 may be provided around each second and third apertures 215, 216, and a divider 218 may be positioned between second and third apertures 215, 216. As set forth in block 20, and seen in FIG. 5, in further response to the second user input command, collage module 116 in turn populates second aperture 215 with first selected digital image 210a and populates the third aperture 216 with second selected digital image 210b to generate the digital image collage 201. Digital image 210b, as well as digital image 210a, may be automatically or manually processed when in aperture 216 to enhance image 201b (sharpness, hue, brightness, etc.), convert image 201b to sepia or black and white, remove red eye, or be manipulated in another manner.

In randomly dividing first aperture 212 into second and third apertures 215, 216, it should be understood that the collage module 116 may take into account certain predefined constraints in determining the resulting size and/or shape of second and third apertures 215, 216. In one aspect, the resulting size and/or shape of each randomly divided second and third apertures 215, 216 may be bound to a predefined minimum aspect ratio (e.g., a height by width ratio equal to 0.7). Alternatively, collage module 116 may also use a predefined maximum aspect ratio (e.g., a height by width ratio equal to 2.6) for determining the size and/or shape of second and third apertures 215, 216. In a further example, collage module 116 cannot randomly divide first aperture 212 such that one or both of second or third aperture 215, 216 has an area smaller than the minimum aspect ratio (e.g., 400 pixels by 400 pixels) and larger than the maximum aspect ratio (e.g., 1000 pixels by 1000 pixels). The minimum and maximum aspect ratios may also be modified to allow the apertures to fit into layout 204 either in a portrait or landscape configuration. It should also be understood that user interface 200 may be configured to allow a user to modify the predefined minimum and/or maximum aspect ratios. User interface 200 may also be configured to allow a user to manually modify the size and/or shape aperture area, if needed. While the shape of apertures shown and described previously or below, including first, second or third apertures 212, 213, 214, are shown as being rectangular in shape, it should be understood that any shape is contemplated herein, including but not limited to, squares, circles, and ovals.

In another aspect, when a digital image is selected by a user for population into an aperture of layout 204, collage module 116 may automatically crop the selected digital image (or allow for manual cropping by the user) so that the digital image fits within the aperture. This method of cropping may take many different forms. For example, in one non-limiting example, the selected digital image may be cropped so that the central focal point of the digital image is displayed in collage layout 204. In this example, once the aperture is randomly divided, collage module 116 may identify the center point (not shown) of the area of the aperture. Once the center point is identified, the center of the corresponding digital image will be aligned relative to the center point of the aperture and any portions of the digital image falling outside the aperture boundaries will be removed accordingly. In other non-limiting example, facial recognition software may be used to perform the crop in a manner that all faces in the digital image will be displayed in its respective aperture and not removed through the cropping process. It should also be understood that each generated aperture is automatically associated with all of the data related to the digital image (including the image data that was deleted due to cropping) to allow for the modification of digital image constraints after being populated in the aperture, in order to optimize placement of the digital images within the aperture. For instance, collage module 116 may allow a user to reposition a digital image after it has been populated in an aperture.

After each digital image is populated in layout 204, an indicator 220 may be provided for each of the selected digital images displayed in catalog segment 206. As shown in FIG. 5, for example, indicator 220 may be in the form of a shaded layer including a check box graphic placed in association with each selected digital image. However, any type of indicator may be embodied any manner which allows a user to identify which digital image has a corresponding digital image that has already populated in layout 204.

Figure 6:
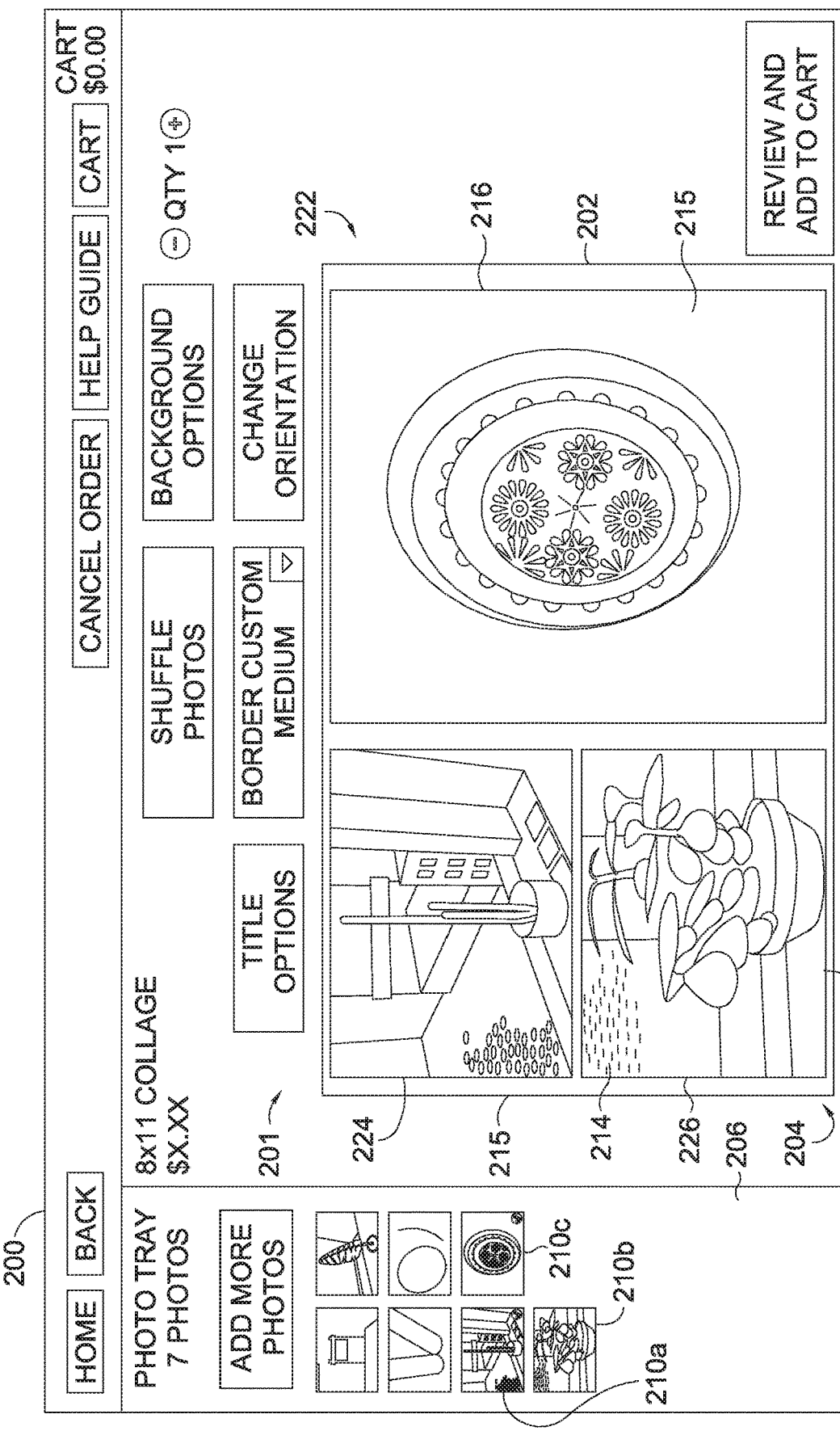
FIG. 6 is an exemplary screen shot of the user interface in FIG. 2 showing another step of the algorithmic method for generating the digital image collage including the first digital image, the second digital image, and a third digital image.

In a further aspect, as best seen in FIGS. 3 and 6, collage module 116 may further include executable instructions that allow for receiving a third user input command on a third selected digital image 210c. In response to the third user input command, collage module 116 automatically changes layout 204 from second arrangement 214 to a third arrangement 222. To arrive at third arrangement 222, collage module 116 randomly divides either second aperture 215 or third aperture 216 into two parts, namely, into a fourth aperture 224 and a fifth aperture 226. This random division includes dividing either second aperture 215 or third aperture 216 into two equal or unequal parts along either the vertical axis, horizontal axis, along a diagonal (non-perpendicular) axis. In another aspect, second aperture 215 or third aperture 216 may be divided using a curved line. Collage module 116 may then randomly select which of the selected digital images 210a, 210b, 201c will be populated into the resulting generated apertures. In the example provided in the sequence shown in FIGS. 5 and 6, second aperture 215 was randomly divided in a horizontal direction into fourth aperture 224 and fifth aperture 226. Further, first selected digital image 210a was populated into fourth aperture 224, second selected digital image 210b was populated into fifth aperture 226, and third selected digital image 210c was populated into third aperture 216. It should be understood that even though third aperture 216 was not randomly divided in the example provided in FIG. 6, this does not mean that the area of third aperture 216 must remain constant, as the shape and area of third aperture 216 may change in this instance. The preselected height and width of collage template 202 (e.g., 5000 pixels×5000 scan lines) does not change upon the generation of each new aperture, but could be changed if the user desires, or if the collage module 116 determines it is necessary due to a predetermined constraint. Digital image 210c, as well as digital images 210a and 210b, may be automatically or manually processed when in aperture 216 to enhance image 201c (sharpness, hue, brightness, etc.), convert image 201c to sepia or black and white, remove red eye, or be manipulated in another manner.

Figure 7:
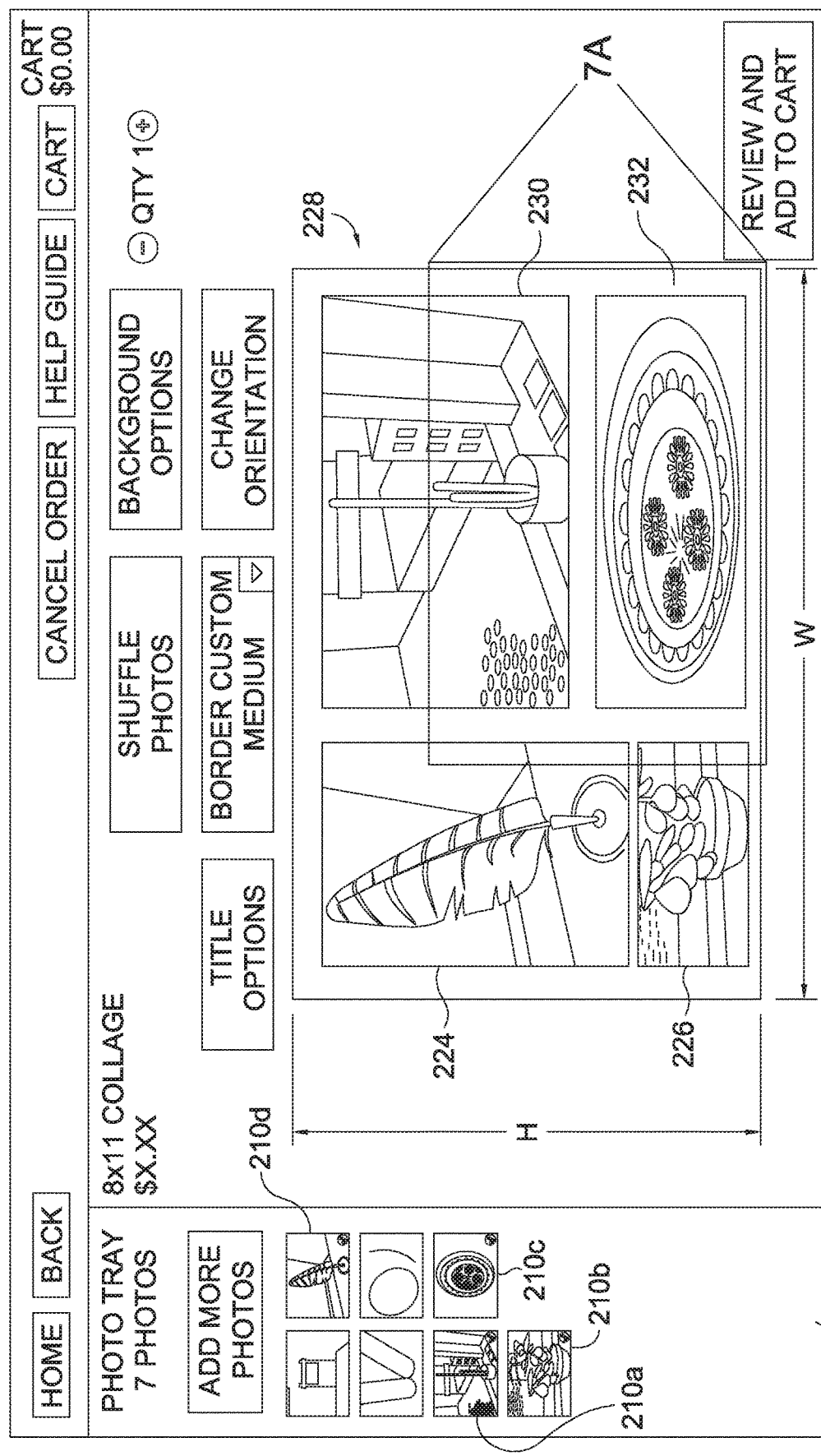
FIG. 7 is an exemplary screen shot of the user interface in FIG. 2 showing another step of the algorithmic method for generating the digital image collage including the first digital image, the second digital image, the third digital image, and a fourth digital image.

As best seen in FIG. 7, collage module 116 includes executable instructions that provide the receipt of additional user input commands that allow for additional digital images from catalog segment 206 to be selected and populated into layout 204, which results in a new arrangement to be generated including additional apertures according to the same methodology described above. For example, digital image 210d may be selected from catalog segment 206, and third aperture 216 may be randomly split into sixth aperture 230 and seventh aperture 232, and all of the digital images 210a-210d may be populated into the resulting apertures 224, 226, 230, 232. In this new arrangement 228, the size and shapes of each of apertures 224, 226, 230, 232 may stay the same or change. Digital image 210d, as well as digital images 210a, 201b, 201c, may be automatically or manually processed when in aperture 212 to enhance image 201a (sharpness, hue, brightness, etc.), convert image 201a to sepia or black and white, remove red eye, or be manipulated in another manner.

In another aspect, collage module 116 may automatically calculate a weight for each generated aperture. This weight may be determined using one or more of the aperture area, normalized ratio, ratio coefficient, error percentage, and error percentage coefficient. Once each weight is calculated for each generated aperture, the algorithmic method determines if the aperture having the greatest weight comprises an aperture area outside the desired range for the predetermined aspect ratio, as discussed above. If this aperture has an excessive aperture area, collage module 116 will modify this aperture such that the aperture area falls within the boundary of the predefined maximum aspect ratio. Collage module 116 will subsequently move on to the aperture with the next greatest weight and modify that aperture accordingly. As such, this process will continue until all apertures in the layout have been modified.

The calculated weight for each aperture may also be used in determining the order of digital image size priority to be displayed in the layout. For example, the aperture with the greatest weight would be provided to conform to the predetermined maximum aspect ratio, which may be the aperture having the largest area. In turn, the aperture with the next greatest weight would be provided to conform to an aspect ratio which is smaller in size compared to that of the maximum aspect ratio. This would occur until the aperture with the least weight is provided to conform to an aspect ratio smaller than all other assigned aspect ratios. Moreover, in further response to the fourth user input, collage module 116 in turn populates each aperture with the corresponding digital images.

As shown in FIG. 7A, each aperture position and size may be adjusted to account for the width of border 217 and divider 218. Although not required, collage module 116 may provide a preselected border thickness (e.g., 20 pixels), which may be different than the thickness of divider 218, as seen in FIG. 7A. Divider 218 may also be predetermined to provide for a tiled layout design (i.e., horizontal divider line) or may be predetermined to provide for a straight layout design (i.e., vertical divider line), or both (as shown).

Figure 8:
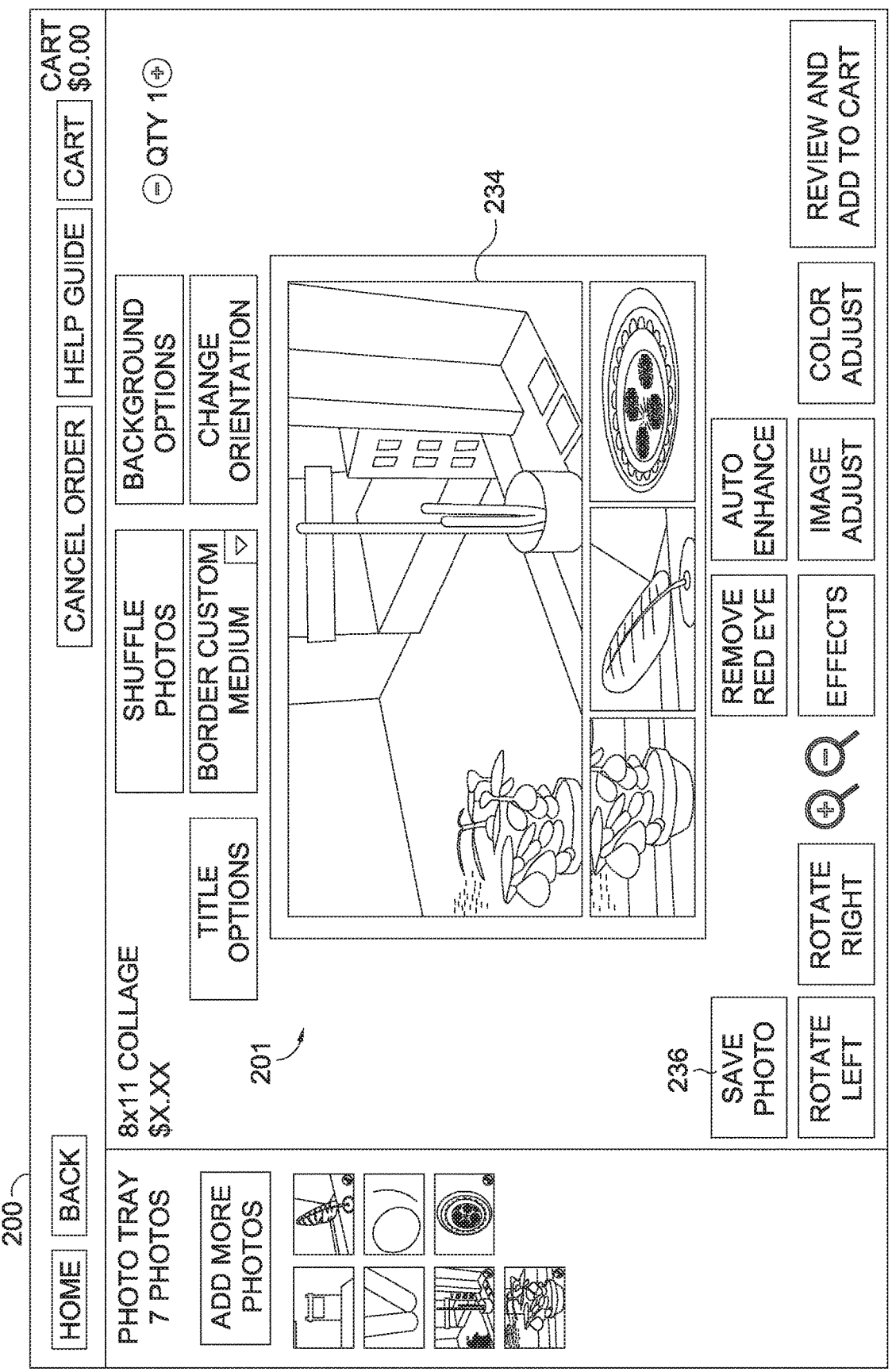
FIG. 8 is an exemplary screen shot similar to FIG. 6 wherein one of the selected digital images is identified as a target image.
Figure 9:
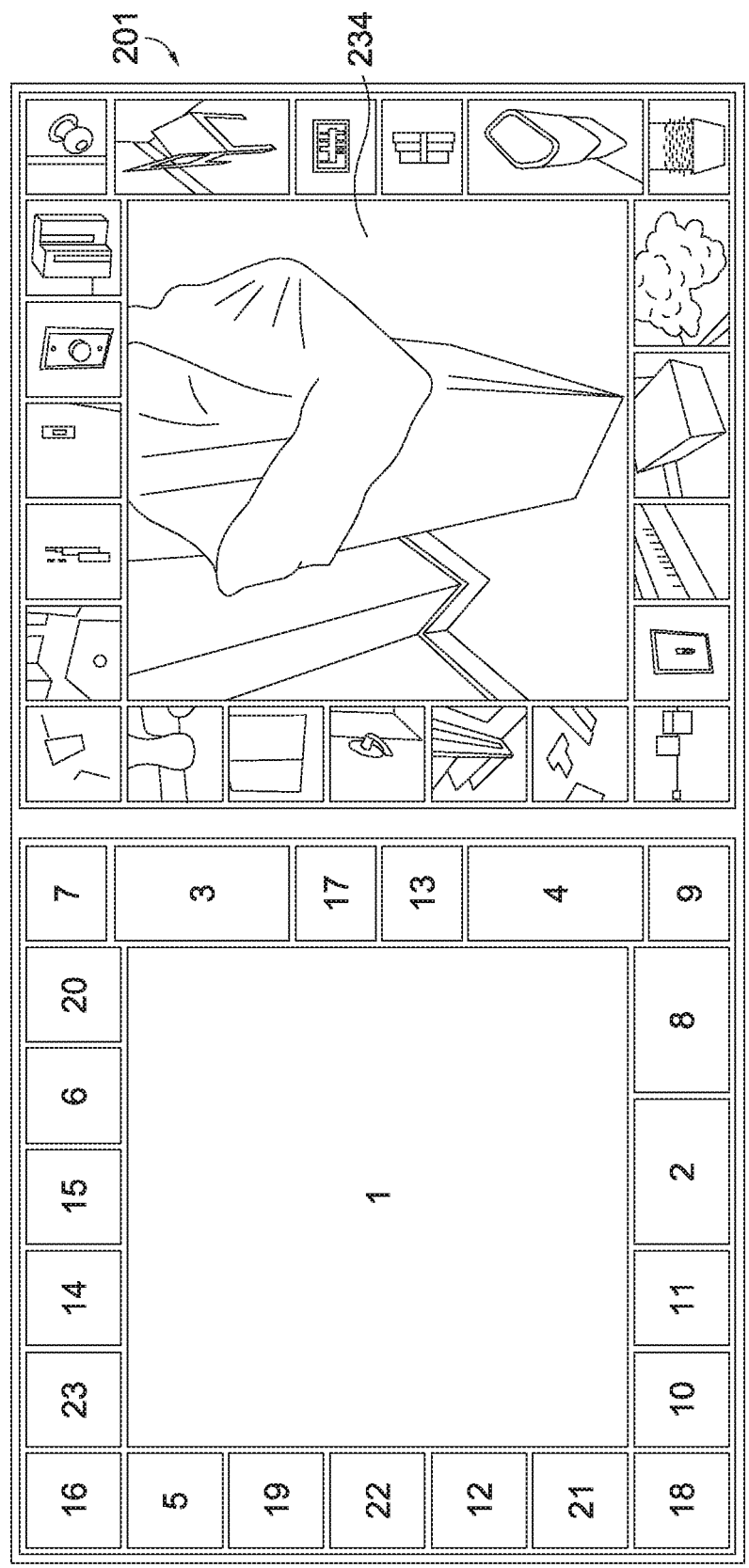
FIG. 9 is another embodiment of exemplary screen shot shown in FIG. 8.

As shown in FIG. 8, collage module 116 also may allow for the selection of a target digital image 234 (i.e., star photo) from the plurality of digital images 210 by providing a user input command using button 236. As such, when target digital image 234 is selected, the selected digital image is automatically assigned to the aperture with the greatest weight. Moreover, whenever a new layout arrangement is created, the aperture with the greatest weight is made to conform to a predetermined aspect ratio having certain minimum/maximum aspect ratio parameters. This results in the selected target digital image 234 having the largest area, as shown in FIG. 8. Target digital image 234 may also be positioned in layout 204 (e.g., centered) so that it is a focal point, such as in FIG. 9. However, even when a target digital image 234 is selected, the other selected digital images displayed in layout 204 preferably should not have an aperture area smaller than a predetermined aspect ratio setting. In one aspect, the size and position of target digital image 234 may be dependent upon the preselected height and width of collage template 202, as well as the number of other non-target digital images 210 in the layout. Further, in another aspect, once a digital image is identified as target digital image 234, then this digital image can no longer be divided. It should be understood that layout 204 may generate as many apertures as the number of selected digital images. For example, as shown in FIG. 9, layout 204 may be configured to comprise as many as 23 digital images. In another aspect, it should be understood that it is contemplated that more than one target digital image 234 may be included in the layout. Collage module 116 also may allow a user to select a specific color for the template layout (e.g., orange).

Figure 10:
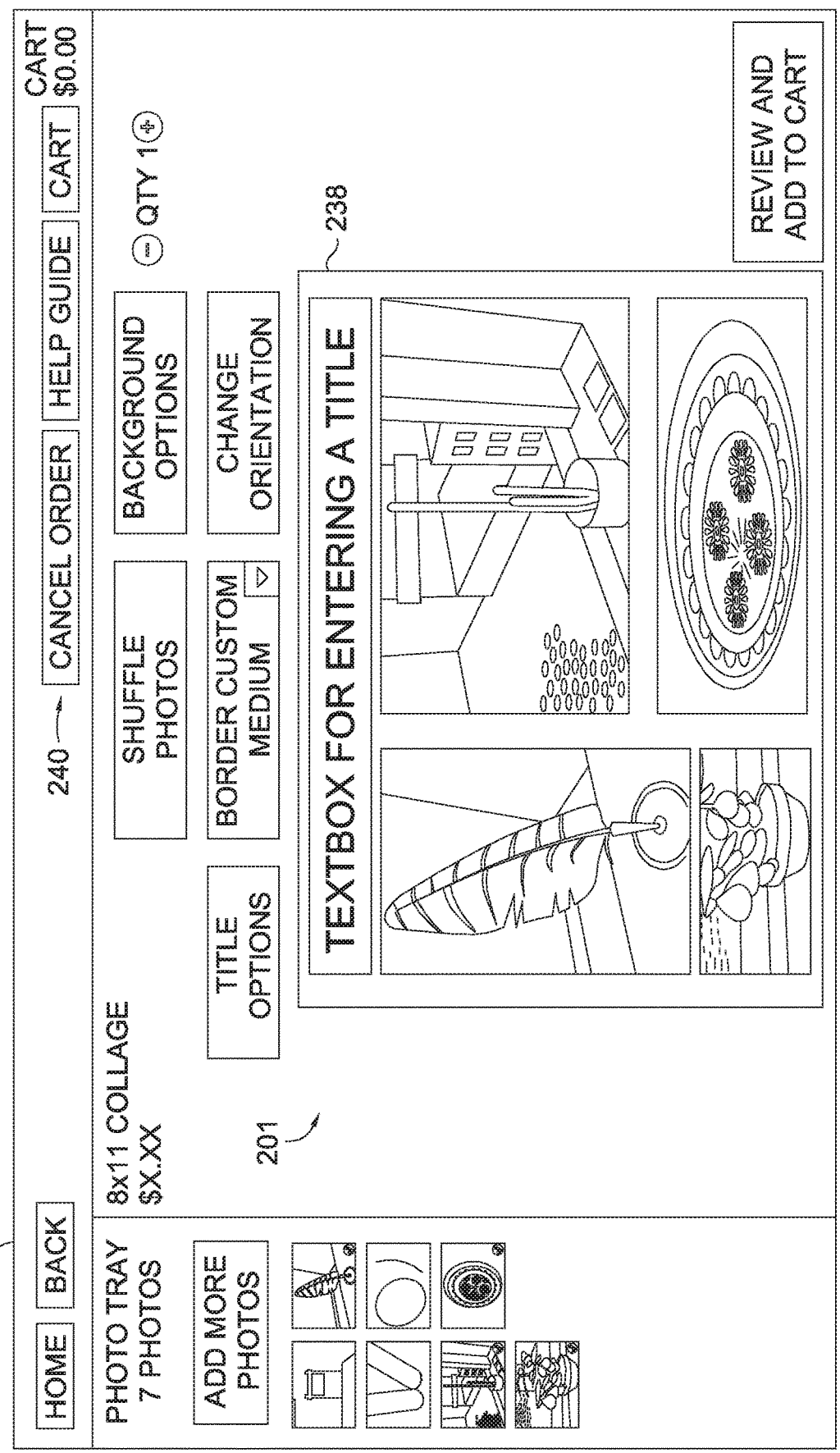
FIG. 10 exemplary screen shot similar to FIG. 6 showing a text box feature.

As shown in FIG. 10, collage template 202 may further include a title segment 238 that allows a user to insert text to label the template that has been generated. User interface 200 may also comprise an ordering segment 240 that allows a user to use collage module 116 to select a print product that will include the generated collage template, optionally provide for payment for the selected print product, and communicate a collage print order directly to one or more of photofinishing devices 102, or indirectly through server 104, via network 112 for fulfillment. It is further contemplated that the collage print order may be both generated and a selected print product fulfilled using photo kiosk 106.

While an exemplary machine-algorithm method for collage module 116 has been described above and with reference to the figures above, it will be understood that certain exemplary embodiments may change the order of steps of the algorithmic method or may even eliminate or modify certain steps.

Having described the exemplary system and exemplary method of the present invention, an exemplary computer environment for implementing the described design and execution is presented next.

Figure 11:
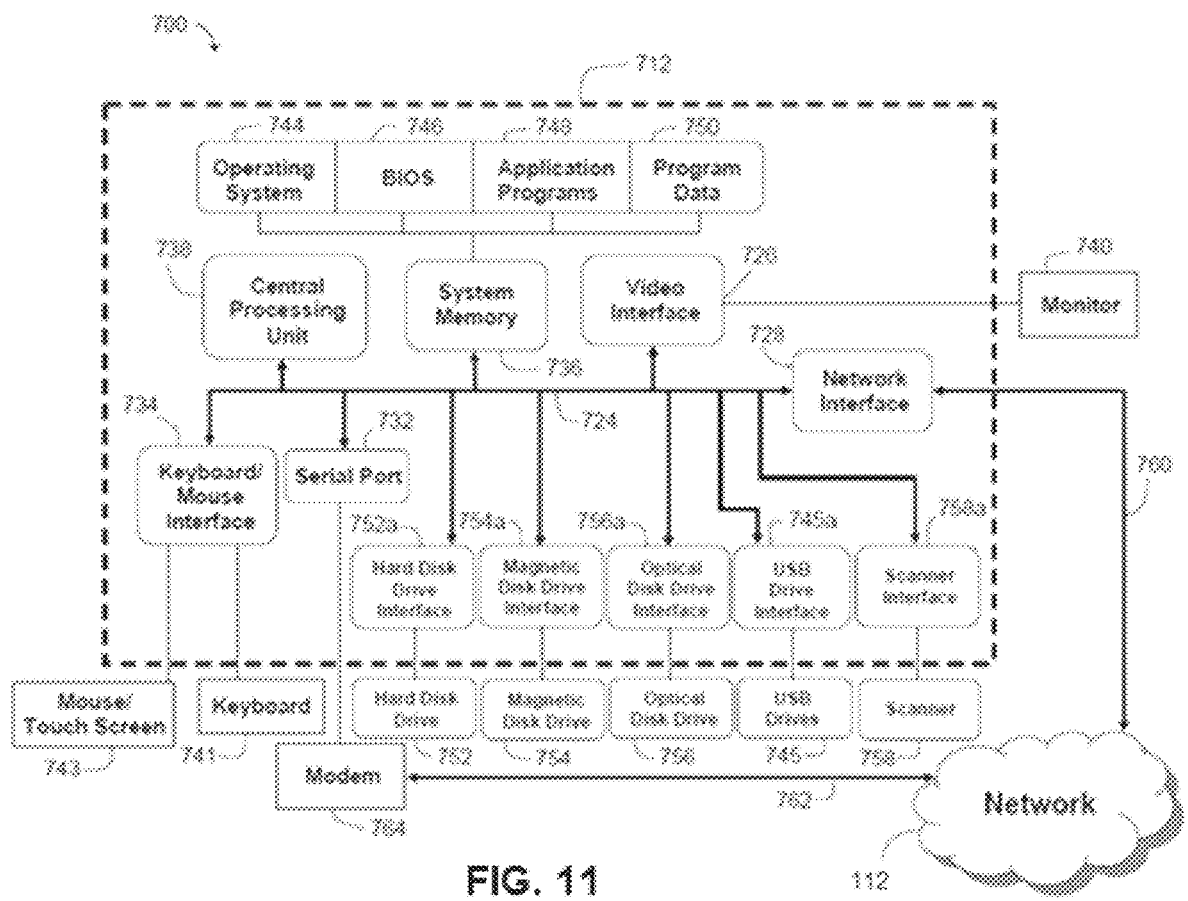
FIG. 11 is a block diagram generally illustrating a computing environment in which the invention may be implemented.

FIG. 11 shows the components of an exemplary computing environment 700 that may be used to implement any of the methods and processing thus far described. Computing environment 700 may include one or more computers 712 (such as, for example, computing devices 104, 106, 108, and 110) comprising a system bus 724 that couples a video interface 726, network interface 728, a keyboard/mouse interface 734, and a system memory 736 (such as memory 114) to a Central Processing Unit (CPU) 738. A monitor or display 740 is connected to bus 724 by video interface 726 and provides the user with a graphical user interface to view, edit, and prepare digital image collage 201 as described above and/or a collage order, such as, for example, using digitally represented still images. The graphical user interface allows the user to enter commands and information into computer 712 using an interface control that may include a keyboard 741 and a user interface selection device 743, such as a mouse, touch screen, or other pointing device. Keyboard 741 and user interface selection device are connected to bus 724 through keyboard/mouse interface 734. The display 740 and user interface selection device 743 are used in combination to form the graphical user interface which allows the user to implement at least a portion of the present invention. Other peripheral devices may be connected to the remote computer through universal serial bus (USB) drives 745 to transfer information to and from computer 712. For example, cameras and camcorders may be connected to computer 712 through serial port 732 or USB drives 745 so that data representative of a digitally represented still image, text, music, video, or other digital content may be downloaded to memory 736 (such as memory 114) or another memory storage device, associated with computer 712 such that the images and print product may be subsequently printed by photofinishing device 102 in accordance with the present invention.

The system memory 736 is also connected to bus 724 and may include read only memory (ROM), random access memory (RAM), an operating system 744, a basic input/output system (BIOS) 746, application programs 748 and program data 750. The computer 712 may further include a hard disk drive 752 for reading from and writing to a hard disk, a magnetic disk drive 754 for reading from and writing to a removable magnetic disk (e.g., floppy disk), and an optical disk drive 756 for reading from and writing to a removable optical disk (e.g., CD ROM or other optical media). The computer 712 may also include USB drives 745 and other types of drives for reading from and writing to flash memory devices (e.g., compact flash, memory stick/PRO and DUO, SD card, multimedia card, smart media xD card), and a scanner 758 for scanning items such as still image photographs to be downloaded to computer 512. A hard disk drive interface 752 a, magnetic disk drive interface 754 a, an optical drive interface 756 a, a USB drive interface 745 a, and a scanner interface 758 a operate to connect bus 724 to hard disk drive 752, magnetic disk drive 754, optical disk drive 756, USB drive 745 and scanner 758, respectively. Each of these drive components and their associated computer-readable media may provide computer 712 with non-volatile storage of computer-readable instruction, program modules, data structures, application programs, an operating system, and other data for computer 712. In addition, it will be understood that computer 712 may also utilize other types of computer-readable media in addition to those types set forth herein, such as digital video disks, random access memory, read only memory, other types of flash memory cards, magnetic cassettes, and the like.

Computer 712 may operate in a networked environment using logical connections with network 112. Network interface 728 provides a communication path 760 between bus 724 and network 112, which allows, for example, a collage order to be communicated to photofinishing device 102. The collage order, for example, may also be communicated from bus 724 through a communication path 762 to network 112 using serial port 732 and a modem 764. It will be appreciated that the network connections shown herein are merely exemplary, and it is within the scope of the present invention to use other types of network connections between computer 712 and network 112 including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method programmed for execution in a computing environment for generating a digital image collage, utilizing a processor the method comprises:
   a) displaying a user interface comprising a collage template including a layout, a catalog segment, and an interface control configured to provide one or more user input commands;
   b) displaying a plurality of digital images in the catalog segment;
   c) receiving a first user input command on a first selected digital image from the plurality of digital images in the catalog segment, and in response to the first user input command:
       generating a first aperture in the layout to establish a first arrangement, and
       populating the first aperture with the first selected digital image;
   d) receiving a second user input command on a second selected digital image from the plurality of digital images in the catalog segment, and in response to the second user input command:
       randomly dividing the first aperture into a second aperture and a third aperture to change the layout from the first arrangement to a second arrangement, wherein each of the second aperture and the third aperture are assigned a weight, wherein assigning the weight takes into account an area of the respective aperture, normalized ratio, ratio coefficient, error percentage, and error percentage coefficient,
       populating the second aperture with the first selected digital image, and
       populating the third aperture with the second selected digital image; and
   e) receiving a third user input command on a third selected digital image from the plurality of digital images in the catalog segment, and in response to the third user input command:
       comparing the weight of the second aperture and the third aperture;
       determining that the second aperture has a greater weight;
       randomly dividing the second aperture in into a fourth aperture and a fifth aperture to change the layout from the second arrangement to a third arrangement,
       populating the third aperture with one of the first selected digital image, the second selected digital image, or the third selected digital image,
       populating the fourth aperture with one of the two remaining selected digital images, and
       populating the fifth aperture with the remaining selected digital image thereby generating the digital image collage.

2. A method in accordance with claim 1, further comprising a step of cropping at least one of the first selected digital image, the second selected digital image, and the third selected digital image prior to being populated into the respective aperture.

3. A method in accordance with claim 1, further comprising a step of cropping including automatically cropping the at least one of the first selected digital image, the second selected digital image, and the third selected digital image.

4. A method in accordance with claim 1, further comprising the steps of:
   receiving a fourth user input command identifying one of the first selected digital image, the second selected digital image, and the third selected digital image as a target digital image; and
   changing the size of the respective aperture so that the respective aperture includes an area that is greater than the other apertures.

5. A method in accordance with claim 1, wherein the step of randomly dividing the first aperture results in the second aperture and the third aperture each having at least one of a minimum aspect ratio and a maximum aspect ratio.

6. A method in accordance with claim 5, wherein the minimum aspect ratio and the maximum aspect ratio is provided for a portrait orientation or a landscape orientation.

7. A method in accordance with claim 1, wherein the random dividing the first aperture results in the second aperture and the third aperture each having a minimum area.

8. A method in accordance with claim 1, wherein the layout includes a border surrounding the second aperture and the third aperture.

9. A method in accordance with claim 1, wherein the user interface further comprises an ordering segment, and the method further comprising the step of receiving a fourth user input command on the ordering segment, and in response to the fourth user input command, communicating a collage order comprising the layout via a network to a print fulfillment device.

10. A method programmed for execution in a computing environment for generating a digital image collage, utilizing a processor the method comprises:
 a) displaying a user interface comprising a collage template including a layout, a catalog segment, and an interface control configured to provide one or more user input commands;
 b) displaying a plurality of digital images in the catalog segment;
 c) receiving a first user input command on a first selected digital image from the plurality of digital images in the catalog segment, and in response to the first user input command:
  generating a first aperture in the layout to establish a first arrangement, and
  populating the first aperture with the first selected digital image;
 d) receiving a second user input command on a second selected digital image from the plurality of digital images in the catalog segment, and in response to the second user input command:
  randomly dividing the first aperture into a second aperture and a third aperture to change the layout from the first arrangement to a second arrangement, wherein each of the second aperture and the third aperture are assigned a weight, wherein assigning the weight takes into account an area of the respective aperture, normalized ratio, ratio coefficient, error percentage, and error percentage coefficient,
  populating the second aperture with the first selected digital image, and
  populating the third aperture with the second selected digital image; and
 e) receiving a third user input command on a third selected digital image from the plurality of digital images in the catalog segment, and in response to the third user input command:
  comparing the weight of the second aperture and the third aperture;
  determining that the third aperture has a greater weight;
  randomly dividing the third aperture into a fourth aperture and a fifth aperture to change the layout from the second arrangement to a third arrangement,
  populating the second aperture with one of the first selected digital image, the second selected digital image, or the third selection digital image,
  populating the fourth aperture with one of the two remaining selected digital images, and
  populating the fifth aperture with the remaining selected digital image thereby generating the digital image collage.

11. A method in accordance with claim 10, further comprising a step of cropping at least one of the first selected digital image, the second selected digital image, and the third selected digital image prior to being populated into the respective aperture.

12. A method in accordance with claim 10, further comprising a step of cropping including automatically cropping the at least one of the first selected digital image, the second selected digital image, and the third selected digital image.

13. A method in accordance with claim 10, further comprising the steps of:
 receiving a fourth user input command identifying one of the first selected digital image, the second selected digital image, and the third selected digital image as a target digital image; and
 changing the size of the respective aperture so that the respective aperture includes an area that is greater than the other apertures.

14. A non-transitory computer-readable medium having thereon computer-executable instructions for performing a method for generating a digital image collage, the method comprising:
 a) displaying a user interface comprising a collage template including a layout, a catalog segment, and an interface control configured to provide one or more user input commands;
 b) displaying a plurality of digital images in the catalog segment;
 c) receiving a first user input command on a first selected digital image from the plurality of digital images in the catalog segment, and in response to the first user input command:
  generating a first aperture in the layout to establish a first arrangement, and
  populating the first aperture with the first selected digital image;
 d) receiving a second user input command on a second selected digital image from the plurality of digital images in the catalog segment, and in response to the second user input command:
  randomly dividing the first aperture into a second aperture and a third aperture to change the layout from the first arrangement to a second arrangement, wherein each of the second aperture and the third aperture are assigned a weight, wherein assigning the weight takes into account an area of the respective aperture, normalized ratio, ratio coefficient, error percentage, and error percentage coefficient,
  populating the second aperture with the first selected digital image, and
  populating the third aperture with the second selected digital image;
 e) receiving a third user input command on a third selected digital image from the plurality of digital images in the catalog segment, and in response to the third user input command:
  comparing the weight of the second aperture and the third aperture;
  determining that the second aperture has a greater weight;
  randomly dividing the second aperture into a fourth aperture and a fifth aperture to change the layout from the second arrangement to a third arrangement,
  populating the third aperture with one of the first selected digital image, the second selected digital image, or the third selected digital image, populating the fourth aperture with one of the two remaining selected digital images, and populating the fifth aperture with the remaining selected digital image thereby generating the digital image collage.

15. A system for generating a digital image collage using a remote computing device, the system comprising:

a server including a memory and a processor, wherein the server is in communication with the remote computing device through a network, and wherein the memory has computer executable instructions stored therein; and a photofinisher device in communication with at least one of the server or the remote computing device through the network, wherein the computer executable instructions in association with the processor are configured to:

a) provide a user interface on a display of the remote computing device comprising a collage template including a layout, a catalog segment, and an interface control configured to provide one or more user input commands;

b) provide for the display of a plurality of digital images in the catalog segment on the display of the remote computing device;

c) receive a first user input command on a first selected digital image from the plurality of digital images in the catalog segment, and in response to the first user input command:

generate a first aperture in the layout to establish a first arrangement, and populate the first aperture with the first selected digital image;

d) receive a second user input command on a second selected digital image from the plurality of digital images in the catalog segment, and in response to the second user input command:

randomly divide the first aperture into a second aperture and a third aperture to change the layout from the first arrangement to a second arrangement, wherein each of the second aperture and the third aperture are assigned a weight, wherein assigning the weight takes into account an area of the respective aperture, normalized ratio, ratio coefficient, error percentage, and error percentage coefficient, populate the second aperture with the first selected digital image, populate the third aperture with the second selected digital image, and generate a collage template file representative of the collage template in the second arrangement including the first selected digital image and the second selected digital image; and e) receive a third user input command on a third selected digital image from the plurality of digital images in the catalog segment, and in response to the third user input command:

compare the weight of the second aperture and the third aperture;

determine that the second aperture has a greater weight;

randomly divide the second aperture into a fourth aperture and a fifth aperture to change the layout from the second arrangement to a third arrangement, populate the third aperture with one of the first selected digital image, the second selected digital image, or the third selected digital image, populate the fourth aperture with one of the two remaining selected digital images, and populate the fifth aperture with the remaining selected digital image thereby generating the digital image collage.

16. A system in accordance with claim 15, wherein the processor is configured for communicating the collage template file to the photofinisher device over the network for printing the digital image collage in the second arrangement including the first selected digital image and the second selected digital image.

17. A system in accordance with claim 15, wherein the first and second digital images are stored in the memory of the server.

18. A system in accordance with claim 15, wherein the remote computing device is a mobile computing device.

19. A system in accordance with claim 15, wherein the remote computing device is a photo kiosk.

* * * * *